July 21, 1925.  1,547,112
J. C. FLOWERS
SCRAP SHEARING ATTACHMENT
Filed May 26, 1922  2 Sheets-Sheet 1
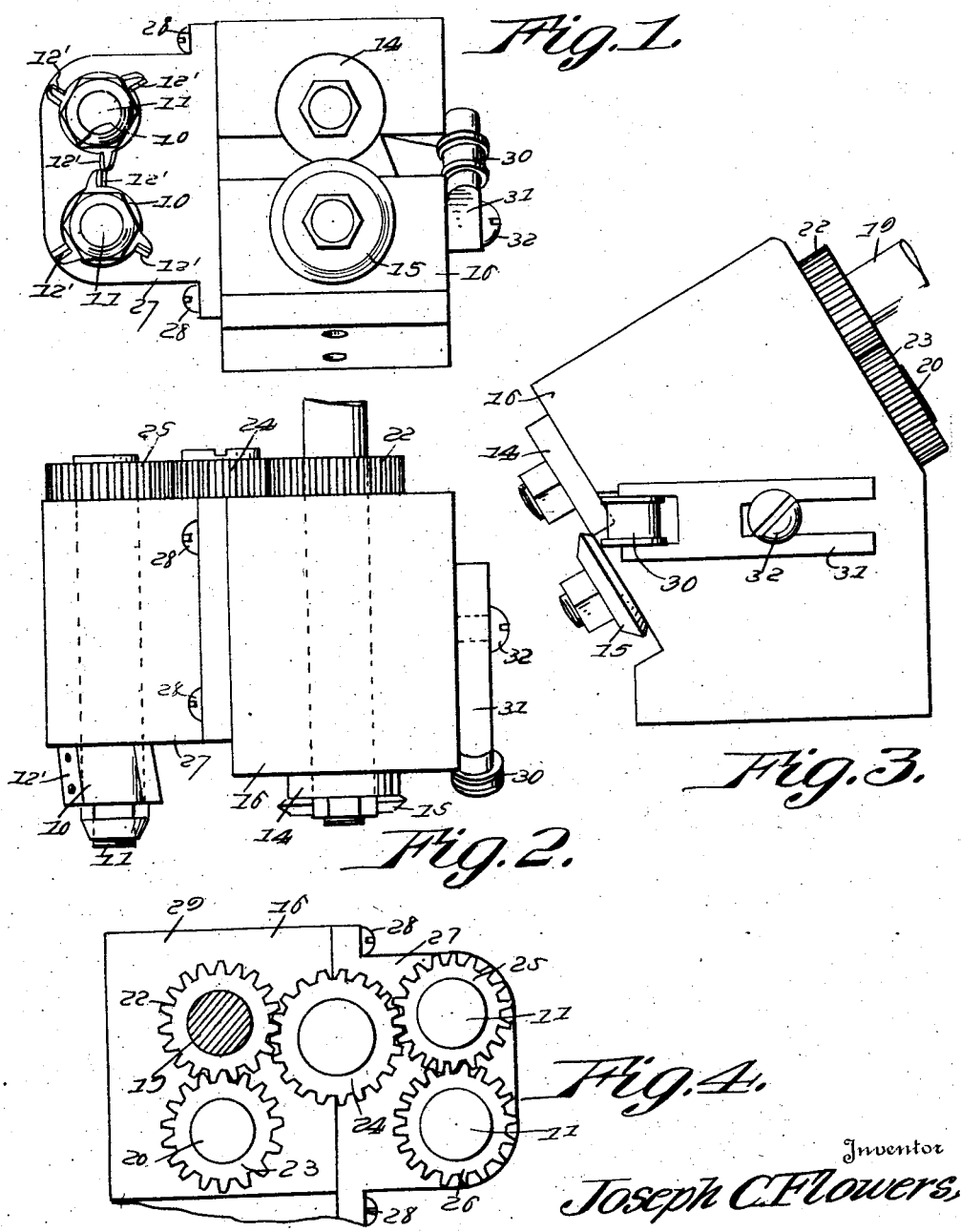
Inventor
Joseph C. Flowers
By
Attorney July 21, 1925. 1,547,112
J. C. FLOWERS
SCRAP SHEARING ATTACHMENT
Filed May 26, 1922 2 Sheets-Sheet 2

Inventor
Joseph C. Flowers,
By
Attorney

Patented July 21, 1925.

1,547,112

UNITED STATES PATENT OFFICE.

JOSEPH C. FLOWERS, OF CORAOPOLIS, PENNSYLVANIA.

SCRAP-SHEARING ATTACHMENT.

Application filed May 26, 1922. Serial No. 563,842.

*To all whom it may concern:*

Be it known that JOSEPH C. FLOWERS, a citizen of the United States of America, residing at Coraopolis, in the county of Allegheny and State of Pennsylvania, has invented new and useful Improvements in Scrap-Shearing Attachments, of which the following is a specification.

The object of the invention is to provide a scrap shearing attachment for trimming machines employed in the preparation of plates for use in connection with boiler and tank construction and which are ordinarily trimmed for the purpose of providing a bevelled edge; and the particular purpose of the scrap shearing attachment is to dispose of the trimming or reduce to a convenient form for handling the otherwise continuous strip or ribbon of material which by reason of the action of the shearing bits or tools is delivered from the machine in a coiled and more or less entangled condition which is subject to interference with the operation of the trimming machine; and with this object in view the invention consists in a construction and combination of parts of which a preferred embodiment is shown in the accompanying drawings, wherein:—

Figure 1 is a front view of a trimming machine provided with a shearing attachment embodying the invention.

Figure 2 is a plan view taken at an angle perpendicular to the plane of the axes of the trimming and shear carrying shafts as indicated by the arrow A in Figure 1.

Figure 3 is a rear view of the machine.

Figure 4 is a side view to show the gearing by which motion is communicated from the drive shaft to the spindles of the scrap cutters.

Figure 5:
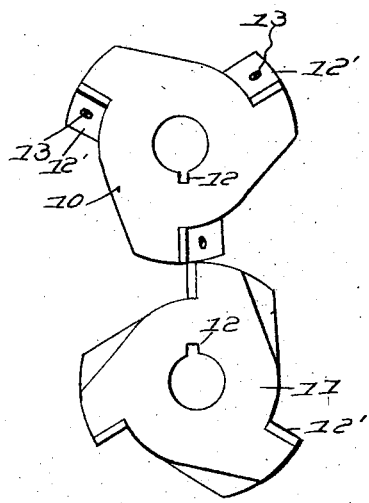
Figures 5 and 6 are respectively face and edge views of the scrap cutter heads or disks.

The scrap cutting attachment consists essentially of cooperative rotary cutter heads or disks 10 reversely disposed, relatively and carried by spindles 11 to which they may be keyed as indicated at 12 or otherwise secured under such conditions as to permit of removal or repair or replacement of the independently replaceable knives 12' held in place by fastening means such as the set screws 13, and said cutter heads or disks are disposed in front of and in a laterally offset relation with the plane of the shearing or trimming cutters 14 and 15 which are disposed on axes arranged in oblique relation with the plane of the table or support 16 which is provided for the stock. The shearing or trimming cutters or heads are carried by shafts 19 and 20 of which the former represents a drive shaft to which power may be applied either through a pulley (not shown) or other suitable gearing, and said shafts are connected for simultaneous rotation in opposite directions at a common or equal rate of speed by means of the gears 22 and 23, and from one of these gears, as for example and preferably the gear which is carried by the drive shaft, motion is communicated through an idle gear 24 to gears 25 and 26 secured to the spindles of the scrap cutter heads or disks, the gears on the spindles of the scrap cutter heads being of corresponding or equal diameter with those on the shafts which carry the shearing cutters arranged so that an equiangular speed of rotation may be imparted to both sets of cutters to insure the operation thereof upon the strip of metal without involving either a tensile strain or a tendency to retard the movement of the trimming or strip which is severed from the plate by the action of the trimming cutters.

Figure 6:
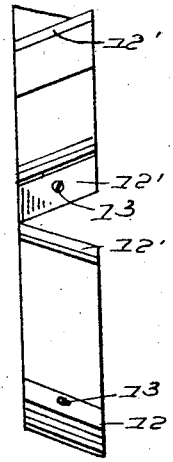
Figure 7:
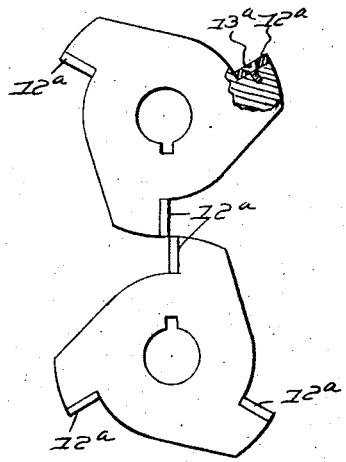
Figures 7 and 8 are similar views of a slightly modified construction of the cutter heads or disks.
Figure 8:
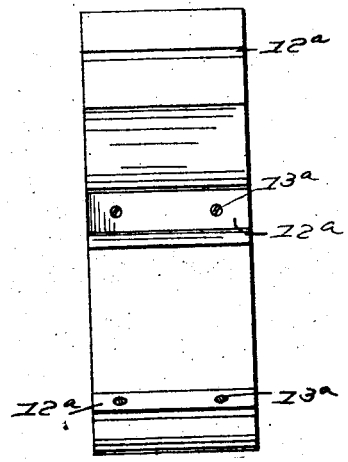

In the illustrated embodiment of the invention the spindles which carry the scrap cutting heads or disks are mounted in a bearing block 27 which is attachable as by means of bolts or lag screws 28 through the boxing 29 in which the shafts of the trimming disks are mounted, to the end that the device forming the subject matter of the invention may be applied to an ordinary construction of plate trimming machine or tool to take care of the strip of metal which is severed from the main plate in the trimming operation, and as above indicated the scrap cutting heads of the attachment are offset laterally from the plane of the trimming heads in order to lie directly in the path of the strip trimmed from the plate, said strip having a tendency to assume a forwardly divergent relation with the edge of the plate by reason of the action of the trimming blades or cutters, and whereas the knives of the scrap cutting heads or disks may be arranged parallel with the axes of the heads as shown in Figures 7 and 8 wherein the knives are represented at 12$^a$; it is preferable as shown in Figures 5 and 6 to dispose said blades in oblique relation with or at a spiral angle to the axes of the heads or disks so as to provide for a shearing relation between the cutting edges of the blades as they successively meet in pairs to cut the trimming strip and reduce it to short lengths to facilitate the handling and removal thereof and prevent the interference thereof with the operation of the machine,—the shearing action of said blades serving to reduce the resistance which is offered by the scrap cutting attachment to the operation of the trimming mechanism.

As in the ordinary construction the depth of the strip trimmed from the plate is determined by means of a groove guide roller 30 supported by a bracket 31 which is adjustably mounted on the frame of the trimmer and is secured in place in the desired relation to the trimming cutters by a setscrew 32.

While the cutting mechanism forming the essential feature of this invention has been herein particularly described as designed especially for use as an attachment to or in connection with and adapted to be driven either by or independently of a metal trimming machine as a means of cutting the trimmings or scrap, and for which specific purpose the device is specially adapted, it will be understood that the utility and advantages of the cutter per se, consisting of the cooperative cutter heads are not limited to this particular adaptation or application and should not be so construed. The special features of the cutting mechanism including the oppositely revoluble cooperating heads having their axes arranged in substantial parallelism and geared together for synchronous movement and having their blades disposed in substantially radial planes but with their cutting edges in angular relation with the axes of the heads, the angular inclination of the cutting edges of the blades or one head being in the opposite direction to that of the other head so as to provide a relative shearing action of the blades in the rotation of the heads, is adapted for general metal cutting operations where strength, accuracy and economy of time and effort are essential to the economical and practical cutting of metal and like materials.

Having described the invention, what is claimed as new and useful is:—

A metal cutting apparatus consisting of cooperating blade carrying heads mounted for rotary movement in opposite directions, the axes of said heads being in substantial parallelism and the blades of said heads being disposed in substantially radial planes with the cutting edges of the blades arranged at spiral angles with respect to the axes of the heads and disposed in opposite directions, the cutting edges of the blades being arranged in shearing relation.

In testimony whereof he affixes his signature.

JOSEPH C. FLOWERS.